United States Patent
Kim

(10) Patent No.: US 9,569,970 B2
(45) Date of Patent: Feb. 14, 2017

(54) BACK-SIDEWAYS ALARMING SYSTEM FOR VEHICLE AND ALARMING CONTROL METHOD THEREOF

(71) Applicant: MANDO CORPORATION, Pyeongtaek-si (KR)

(72) Inventor: Dong Myeong Kim, Seongnam-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 211 days.

(21) Appl. No.: 14/306,010

(22) Filed: Jun. 16, 2014

(65) Prior Publication Data
US 2015/0054952 A1     Feb. 26, 2015

(30) Foreign Application Priority Data

Aug. 21, 2013  (KR) .................. 10-2013-0099168

(51) Int. Cl.
    *G08G 1/16* (2006.01)
    *G06K 9/00* (2006.01)

(52) U.S. Cl.
    CPC ........... *G08G 1/167* (2013.01); *G06K 9/00798* (2013.01)

(58) Field of Classification Search
    CPC .................... G08G 1/167; G06K 9/00798
    See application file for complete search history.

(56) References Cited

U.S. PATENT DOCUMENTS

| | | | | |
|---|---|---|---|---|
| 6,748,302 B2* | 6/2004 | Kawazoe | ............. | G05D 1/0246 340/937 |
| 7,788,033 B2* | 8/2010 | Isaji | .................. | B60Q 9/008 340/903 |
| 8,112,222 B2* | 2/2012 | Nakao | ................ | G01C 21/3602 340/435 |
| 8,385,600 B2* | 2/2013 | Nara | .................. | G06K 9/00798 382/104 |
| 2006/0250224 A1* | 11/2006 | Steffel | .................. | G01S 13/931 340/435 |
| 2008/0015778 A1* | 1/2008 | Matsuura | ............... | G08G 1/166 701/301 |
| 2010/0246889 A1* | 9/2010 | Nara | .................. | G06K 9/00798 382/104 |

(Continued)

FOREIGN PATENT DOCUMENTS

KR      1998-021413      6/1998
KR      10-2007-0004300  1/2007

*Primary Examiner* — Sath V Perungavoor
*Assistant Examiner* — Philip Dang
(74) *Attorney, Agent, or Firm* — Ladas & Parry, LLP

(57) ABSTRACT

Provided are a back-sideways alarming system and an alarming control method, which are capable of reducing the generation of a false alarm by detecting a driving road environment of a vehicle and preventing an unnecessary alarm caused by target information generated at a centerline of a road and an outside of a road. The back-sideways alarming system includes: an image acquiring unit configured to acquire road information of a vehicle; a collecting unit configured to collect target information on targets located around the vehicle; and an electronic control unit configured to recognize a lane based on the road information acquired by the image acquiring unit, reset an alarm area according to information on the recognized lane and the road information, and generate an alarm when the target information is located in the reset alarm area.

16 Claims, 3 Drawing Sheets

(a)

(b)

(56) References Cited

U.S. PATENT DOCUMENTS

2012/0271483 A1* 10/2012 Samukawa ........... B60W 50/14 701/1
2012/0277957 A1* 11/2012 Inoue ................... B60W 30/12 701/41
2013/0128001 A1* 5/2013 You ..................... G06K 9/00208 348/47

* cited by examiner (a)

(b)

BACK-SIDEWAYS ALARMING SYSTEM FOR VEHICLE AND ALARMING CONTROL METHOD THEREOF

CROSS-REFERENCE(S) TO RELATED APPLICATION

This application claims priority of Korean Patent Application No. 10-2013-0099168, filed on Aug. 21, 2013, in the Korean Intellectual Property Office, the contents of which are incorporated herein by reference in its entirety.

BACKGROUND OF THE INVENTION

Field of the Invention

The present invention relates to a back-sideways alarming system and an alarming control method thereof, and more particularly, to a back-sideways alarming system and an alarming control method, which are capable of reducing the generation of a false alarm by detecting a driving road environment of a vehicle and preventing an unnecessary alarm caused by target information generated at a centerline of a road and an outside of a road.

Description of the Related Art

Recently, systems for preventing various safety accidents during driving have been developed and mounted on vehicles. One example of these systems is a back-sideways alarming system that alarms a risk of collision between a self-vehicle and a back-sideways object.

Back-sideways alarming systems are disclosed in Korean Patent Publication No. 10-1998-0021413 (Document 1) and Korean Patent Publication No. 10-2007-0004300 (Document 2). Such back-sideways alarming systems are designed to ensure the safety of a vehicle and a driver in a blind spot where the field of vision of the driver is obstructed during a lane change, parking, or driving.

However, according to the related art, including the above-mentioned patents, all predetermined areas around a vehicle are set as alarm areas, without considering a driving lane. Therefore, it is inconvenient for a driver because an alarm is generated even when a false alarm happens due to a vehicle across a centerline or a guardrail or a diffused-reflection noise signal.

In particular, if a false alarm is generated in a road environment like a two-way single lane, a driver promptly confirms the fact of the false alarm. Therefore, the influence of the false alarm becomes more significant.

If the generation of the false alarm is repeated, the reliability of the back-sideways alarming system from the driver is lowered. Therefore, there is a need for a back-sideways alarming system that is capable of generating an alarm in a necessary area by resetting an alarm area according to an actual road environment.

CITATION LIST

Patent Literature (Patent Literature 1) Korean Patent Publication No. 1998-0021413, entitled "OVER-ALARMING SUPPRESSING METHOD OF SIDE COLLISION ALARMING APPARATUS" (Mando Machinery Corp and one other) Jun. 25, 1998.

(Patent Literature 2) Korean Patent Publication No. 2007-0004300, entitled "REAR SIDE APPROACH VEHICLE ALARMING METHOD AND SYSTEM USING IMAGE RECOGNITION (Hyundai Motor Company) Jan. 9, 2007.

SUMMARY OF THE INVENTION

The present invention has been made in an effort to solve the above problems and is directed to provide a back-sideways alarming system and an alarming control method, which are capable of reducing the generation of a false alarm by detecting a driving road environment of a vehicle and preventing an unnecessary alarm caused by target information generated at a centerline of a road and an outside of a road.

According to an embodiment of the present invention, a back-sideways alarming system includes: an image acquiring unit configured to acquire road information of a vehicle; a collecting unit configured to collect target information on targets located around the vehicle; and an electronic control unit configured to recognize a lane based on the road information acquired by the image acquiring unit, reset an alarm area according to information on the recognized lane and the road information, and generate an alarm when the target information is located in the reset alarm area.

The electronic control unit may include: a receiving unit configured to receive the road information acquired by the image acquiring unit and the target information collected by the collecting unit; a determining unit configured to recognize a lane from the road information received by the receiving unit and analyze a color and shape of the recognized lane to determine on which lane the vehicle is running; and an alarm area resetting unit configured to reset an alarm area by deleting a left alarm area of the vehicle when it is determined that the vehicle is running on a first lane and deleting a right alarm area of the vehicle when it is determined that the vehicle is running on a last lane.

The electronic control unit may include a target deleting unit configured to delete target information when the target information is collected from the deleted alarm area.

When the target information entering the alarm area reset by the alarm area resetting unit is received, the electronic control unit may output a preset alarm generation signal to an alarm generating unit.

The electronic control unit may include: a receiving unit configured to receive the road information acquired by the image acquiring unit and the target information collected by the collecting unit; a determining unit configured to recognize a lane from the road information received by the receiving unit and analyze a color and shape of the recognized lane to determine on which lane the vehicle is running; and an alarm area resetting unit configured to reset an alarm area by deleting an alarm area disposed outside a centerline when it is determined that the vehicle is running on a first lane and deleting an alarm area disposed outside a last lane when it is determined that the vehicle is running on the last lane.

According to another embodiment of the present invention, an alarming control method of a back-sideways alarming system includes: receiving road information of a vehicle which is acquired by an image acquiring unit installed in the vehicle; receiving target information on targets located around the vehicle, the target information being collected by an information collecting unit installed in the vehicle; and recognizing a lane based on the received road information, resetting an alarm area according to information on the recognized lane and the road information, and generating an alarm when the target information is located in the reset alarm area.

The step of generating the alarm may include: recognizing a lane from the received road information and analyzing a color and shape of the recognized lane to determine on which lane the vehicle is running; and resetting an alarm area by deleting a left alarm area of the vehicle when it is determined that the vehicle is running on a first lane and deleting a right alarm area of the vehicle when it is determined that the vehicle is running on a last lane.

The alarming control method may further include, after the step of resetting the alarm area, deleting target information when the target information is collected from the deleted alarm area.

The step of generating the alarm may include outputting a preset alarm generation signal to an alarm generating unit when the target information entering the reset alarm area is received.

The step of generating the alarm may include: recognizing a lane from the received road information and analyzing a color and shape of the recognized lane to determine on which lane the vehicle is running; and resetting an alarm area by deleting an alarm area disposed outside a centerline when it is determined that the vehicle is running on a first lane and deleting an alarm area disposed outside a last lane when it is determined that the vehicle is running on the last lane.

DETAILED DESCRIPTION OF EXEMPLARY EMBODIMENTS

Hereinafter, a preferred embodiment of the present invention will be described in detail with reference to the accompanying drawings.

Figure 1:
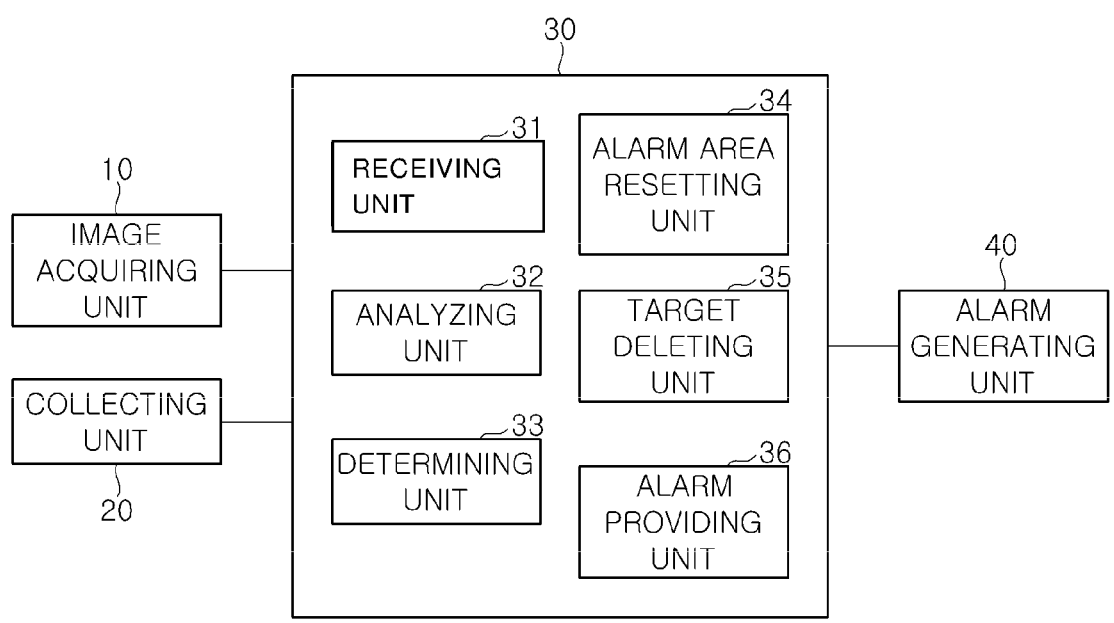
FIG. 1 is a block diagram illustrating a back-sideways alarming system for a vehicle according to an embodiment of the present invention.

FIG. 1 is a block diagram illustrating a back-sideways alarming system for a vehicle according to an embodiment of the present invention.

Referring to FIG. 1, the back-sideways alarming system according to the embodiment of the present invention includes an image acquiring unit 10, a collecting unit 20, an electronic control unit (ECU) 30, and an alarm generating unit 40.

When the vehicle is running on the first lane or the last lane, the back-sideways alarming system does not set both sides of the vehicle as alarm areas, but resets one of both sides of the vehicle as a non-alarm area. When target information is collected from the non-alarm area, the back-sideways alarming system does not generate an alarm. Therefore, it is possible to solve discomfort that a driver feels due to unnecessary alarm generation.

The image acquiring unit 10 included in the back-sideways alarming system may be a camera installed in the front of the vehicle to acquire information on a road on which the vehicle is running.

The image acquiring unit 10 provides the ECU 30 with the acquired road information of the vehicle.

The collecting unit 20 is a type of radar. The collecting unit 20 collects target information including a distance, an angle, a course angle, and a relative speed with respect to a target vehicle running around the vehicle or a target object located around the running vehicle. The target information collected by the collecting unit 20 is transmitted to the ECU 30.

In particular, the collecting unit 20 collects target information including a distance to a rear vehicle running behind the self-vehicle, an angle between the self-vehicle and the rear vehicle, a course angle of the rear vehicle, and a relative speed of the rear vehicle.

The ECU 30 recognizes a lane based on the road information acquired by the image acquiring unit 10. In addition, the ECU 30 determines whether to generate an alarm by using the target information collected by the collecting unit 20. That is, the ECU 30 determines whether to generate an alarm by determining whether the rear vehicle or the target object enters the alarm area of the self-vehicle.

The ECU 30 includes a receiving unit 31, an analyzing unit 32, a determining unit 33, an alarm area resetting unit 34, a target deleting unit 35, and an alarm providing unit 36.

The receiving unit 31 receives the road information acquired by the image acquiring unit 10. In addition, the receiving unit 31 receives the target information collected by the collecting unit 20.

The analyzing unit 32 analyzes a color of the lane and a shape of the lane, based on the road information received through the receiving unit 31. The road information includes information on a color of the lane, a shape of the lane, a median strip, a guardrail, and the like.

The determining unit 33 may determine whether the lane on which the vehicle is running is the first lane, the second lane, the third lane, or the last lane, based on the color and shape of the lane which are recognized and analyzed from the road information by the analyzing unit 32.

When the determining unit 33 determines that the vehicle is running on the first lane, the alarm area resetting unit 34 resets an alarm area by deleting a left alarm area of the vehicle. That is, when that the vehicle is running on the first lane, the alarm area resetting unit 34 sets the left area of the vehicle as a non-alarm area and sets the right area of the vehicle as an alarm area.

In addition, when the determining unit 33 determines that the vehicle is running on the last lane, the alarm area resetting unit 34 resets an alarm area by deleting a right alarm area of the vehicle. That is, when the vehicle is running on the last lane, that is, when the vehicle is running on the lane disposed farthest from the centerline, the alarm area resetting unit 34 sets the right area of the vehicle as a non-alarm area and sets the left area of the vehicle as an alarm area.

The above-described alarm area resetting unit 34 is applied to vehicle types of right-driving countries.

In order to apply to vehicle types of left-driving countries, when the determining unit 33 determines that the vehicle is running on the first lane, the alarm area resetting unit 34 resets an alarm area by deleting an alarm area disposed outside the centerline. When the vehicle is running on the last lane, the alarm area resetting unit 34 resets an alarm area by deleting an alarm area disposed outside the last lane. The centerline refers to a yellow solid line, a yellow dashed line, and a facility such as a median strip or a fence. The last lane refers to a boarder line for distinguishing a roadway from a non-roadway. In the right-driving countries, the outside of the last lane refers to the right side with respect to the vehicle. In the left-driving countries, the outside of the last lane refers to the left side with respect to the vehicle.

In addition, when the determining unit 33 determines that the vehicle is running on a middle lane, the alarm area resetting unit 34 sets both the left and right sides of the vehicle as alarm areas.

When target information is collected from the alarm area reset by the alarm area resetting unit 34, the target deleting unit 35 deletes the collected target information. Therefore, it is possible to fundamentally prevent the generation of a false alarm when alarm target is noise and other structures within an area which should not generate an alarm.

When target information entering the alarm area reset by the alarm area resetting unit 34 is collected, the alarm providing unit 36 provides a preset alarm generation signal to the alarm generating unit 40.

The alarm providing unit 36 determines whether the target information enters a valid alarm area, and provides the alarm generation signal to the alarm generating unit 40 only when the target information enters the valid alarm area.

An alarming control method of the back-sideways alarming system configured as above will be described below with reference to FIG. 2.

Figure 2:
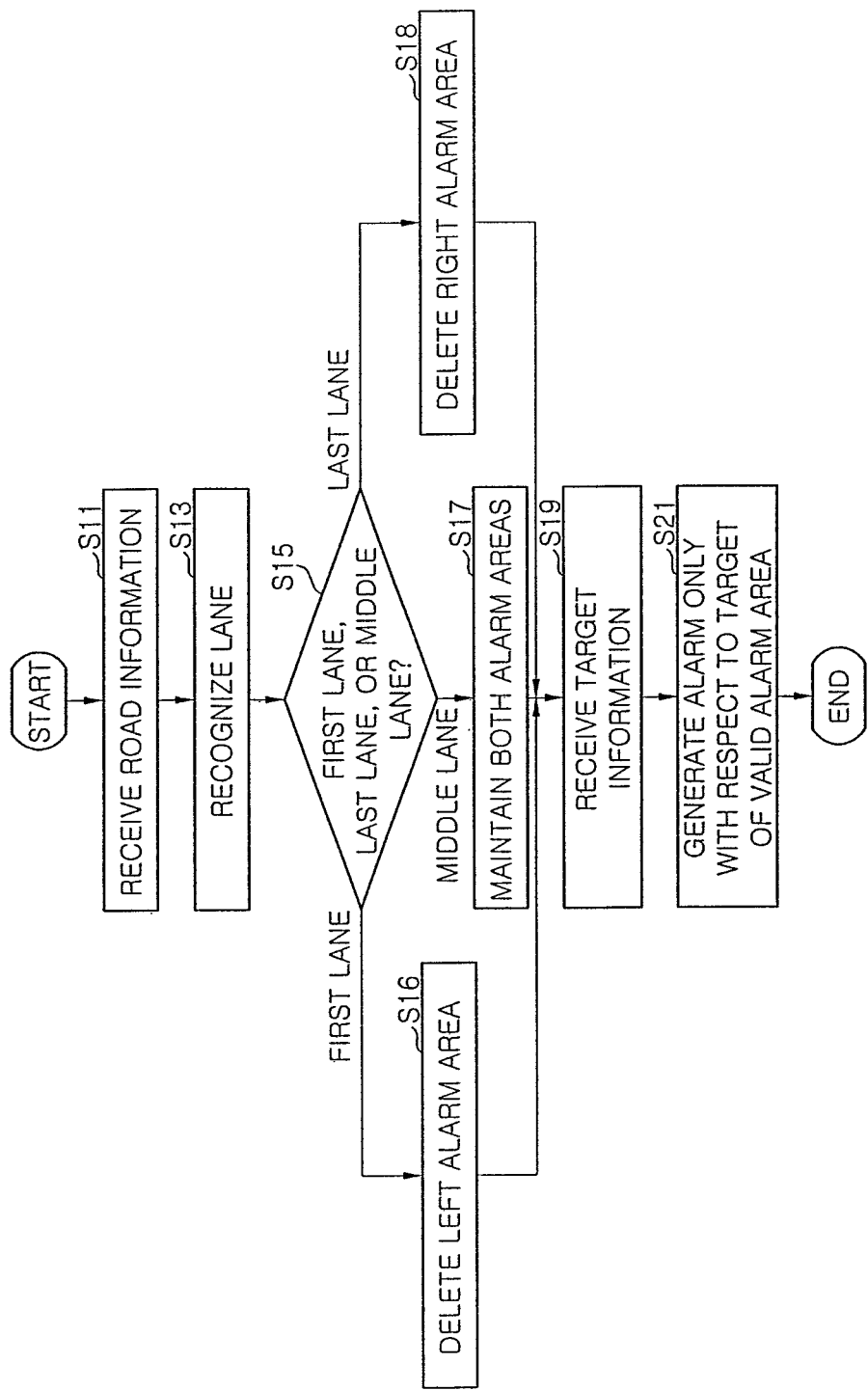
FIG. 2 is an operation flowchart illustrating an alarming control method of a back-sideways alarming system for a vehicle according to an embodiment of the present invention.

FIG. 2 is an operation flowchart illustrating an alarming control method of a back-sideways alarming system for a vehicle according to an embodiment of the present invention.

Referring to FIG. 2, the ECU 30 collects road information acquired by the image acquiring unit 10 (S11).

The ECU 30 recognizes a lane based on the received road information (S13). More specifically, the ECU 30 analyzes an image of the received road information to recognize a color of the lane and a shape of the lane.

The ECU 30 determines whether the recognized lane is the first lane, the last lane, or the middle lane (S15).

Figure 3:
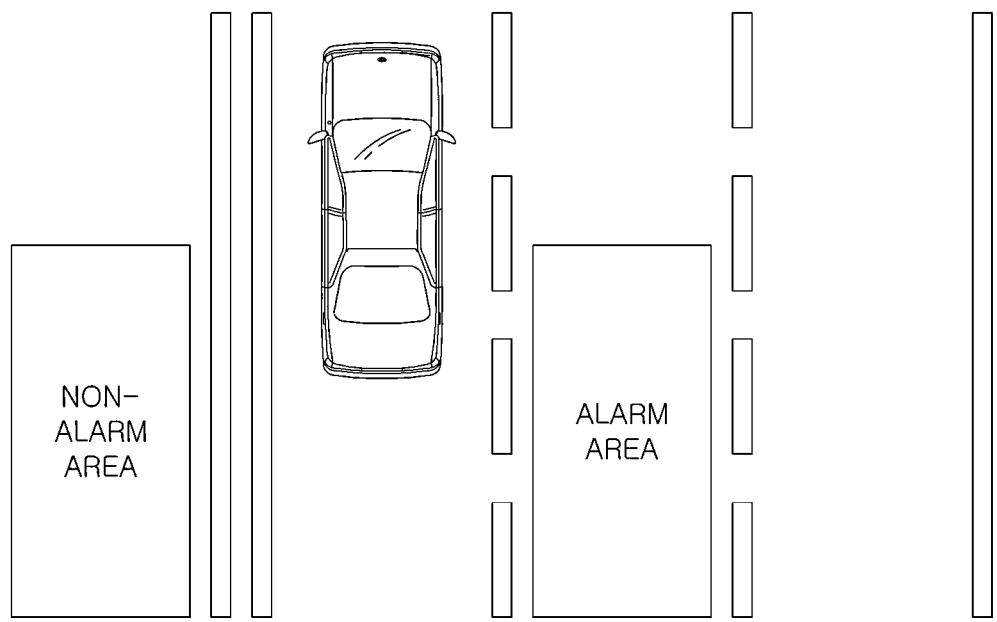
FIG. 3 is a schematic diagram illustrating an alarm area and a non-alarm area.
Figure 3:
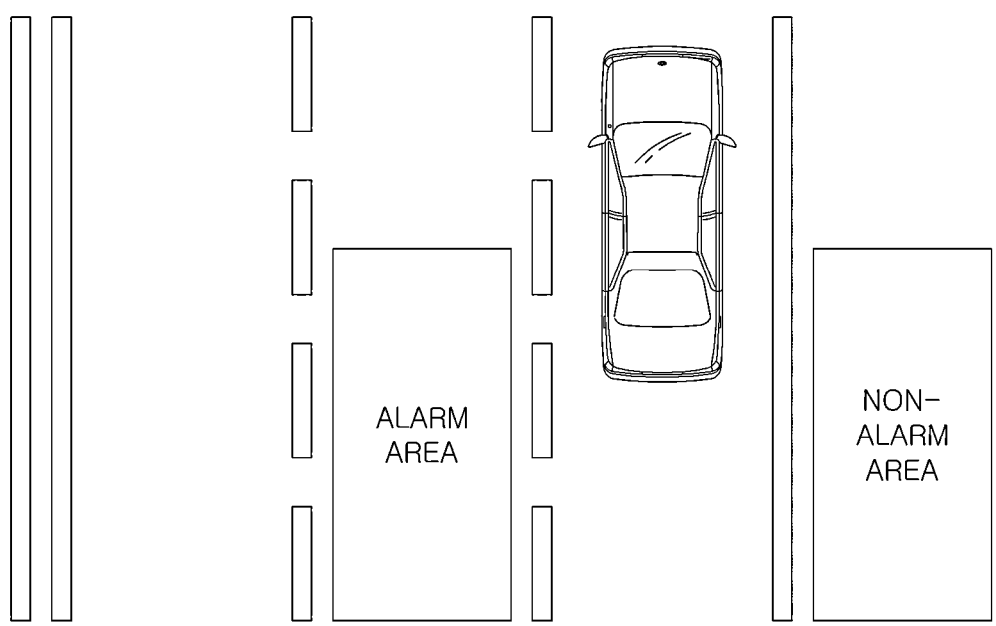

When it is determined in step S15 that the recognized lane is the first lane, the ECU 30 deletes a left alarm area of the vehicle (S16). That is, as illustrated in FIG. 3A, the ECU 30 sets the left alarm area of the vehicle as a non-alarm area, and resets a right alarm area of the vehicle as an alarm area. In the present embodiment, a blind spot, which is the rear back side of the vehicle, is illustrated as the alarm area.

Therefore, when there is a following vehicle or a target object in a blind spot that cannot be seen by a driver, the ECU 30 may give the driver an alarm that there is an obstacle in the blind spot. In the road environment of FIG. 3A, target information may be deleted when the target information is collected from the left non-alarm area of the vehicle.

When it is determined in step S15 that the recognized lane is the middle lane, the ECU 30 maintain the alarm areas preset with reference to the vehicle, that is, both the left alarm area and the right alarm area (S17).

When it is determined in step S15 that the recognized lane is the last lane, the ECU 30 deletes the right alarm area of the vehicle (S18). That is, as illustrated in FIG. 3B, the ECU 30 sets the right alarm area of the vehicle as a non-alarm area, and resets the left alarm area of the vehicle as an alarm area.

Thereafter, the ECU 30 receives the target information collected through the collecting unit 20 (S19). Step S19 may be performed before step S21 to be described below, that is, before or after any one of the above-described steps.

The ECU 30 determines whether the collected target information enters the effective alarm area and provides an alarm generation signal to the alarm generating unit 40 so as to generate an alarm only with respect to a target of the valid alarm area (S21).

In this manner, it is possible to generate an alarm according to an actual driving environment. That is, it is possible to reduce the generation of an alarm caused by noise that is generated by information on targets a driver does not feel as an alarm situation or is generated by other structures adjacent to the vehicle.

According to the embodiment of the present invention, it is possible to reduce the generation of a false alarm by detecting a driving road environment of a vehicle and preventing an unnecessary alarm caused by target information generated at a centerline of a road and an outside of a road.

Furthermore, according to the embodiment of the present invention, when target information is collected from a non-alarm area, the collected target information is deleted. Therefore, it is possible to prevent the generation of a false alarm when an alarm target is noise and other structures within an area which should not generate an alarm. Moreover, it is possible to omit a procedure for preventing the generation of a false alarm. Consequently, the resources inside the vehicle can be saved.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: image acquiring unit | 20: collecting unit |
| 30: electronic control unit | 31: collecting unit |
| 32: analyzing unit | 33: determining unit |
| 34: alarm area resetting unit | 35: target deleting unit |
| 36: alarm providing unit | 40: alarm generating unit |

What is claimed is:

1. A back-sideways alarming system comprising:
   an image acquiring unit configured to acquire road information of a vehicle;
   a collecting unit configured to collect target information on one or more target vehicles or target objects located around the vehicle; and
   an electronic control unit configured to recognize a lane based on the road information acquired by the image acquiring unit, generate an alarm when the one or more target vehicles or target objects located around the vehicle are located in a variably settable alarm area, and change the variably settable alarm area according to information on the recognized lane and the road information.

2. The back-sideways alarming system according to claim 1, wherein the electronic control unit comprises:
   a receiving unit configured to receive the road information acquired by the image acquiring unit and the target information collected by the collecting unit;
   a determining unit configured to recognize a lane from the road information received by the receiving unit and analyze a color and shape of the recognized lane to determine on which lane the vehicle is running; and
   an alarm area resetting unit configured to reset the variably settable alarm area by deleting a left alarm area of the vehicle when it is determined that the vehicle is running on a most left lane and deleting a right alarm area of the vehicle when it is determined that the vehicle is running on a most right lane.

3. The back-sideways alarming system according to claim 2, wherein the electronic control unit comprises a target deleting unit configured to delete target information when the target information is collected from the deleted alarm area.

4. The back-sideways alarming system according to claim 1, wherein when the target information entering the alarm area reset by the alarm area resetting unit is received, the electronic control unit outputs a preset alarm generation signal to an alarm generating unit.

5. The back-sideways alarming system according to claim 1, wherein the electronic control unit comprises:
a receiving unit configured to receive the road information acquired by the image acquiring unit and the target information collected by the collecting unit;
a determining unit configured to recognize a lane from the road information received by the receiving unit and analyze a color and shape of the recognized lane to determine on which lane the vehicle is running; and
an alarm area resetting unit configured to reset the variable settable alarm area by deleting an alarm area disposed outside a centerline when it is determined that the vehicle is running on a first lane and deleting an alarm area disposed outside a last lane when it is determined that the vehicle is running on the last lane.

6. An alarming control method of a back-sideways alarming system, comprising:
receiving road information of a vehicle which is acquired by an image acquiring unit installed in the vehicle;
receiving target information on one or more target vehicles or target objects located around the vehicle, the target information being collected by an information collecting unit installed in the vehicle;
recognizing a lane based on the received road information;
changing a variably settable alarm area according to information on the recognized lane and the road information; and
generating an alarm when the one or more target vehicles or target objects located around the vehicle are located in the variably settable alarm area.

7. The alarming control method according to claim 6, wherein the step of generating the alarm comprises:
recognizing a lane from the received road information and analyzing a color and shape of the recognized lane to determine on which lane the vehicle is running; and
resetting an alarm area by deleting a left alarm area of the vehicle when it is determined that the vehicle is running on a most left lane and deleting a right alarm area of the vehicle when it is determined that the vehicle is running on a most right lane.

8. The alarming control method according to claim 7, further comprising, after the step of resetting the alarm area, deleting target information when the target information is collected from the deleted alarm area.

9. The alarming control method according to claim 6, wherein the step of generating the alarm comprises outputting a preset alarm generation signal to an alarm generating unit when the target information entering the variably settable alarm area is received.

10. The alarming control method according to claim 6, wherein the step of generating the alarm comprises:
recognizing a lane from the received road information and analyzing a color and shape of the recognized lane to determine on which lane the vehicle is running; and
resetting an alarm area by deleting an alarm area disposed outside a centerline when it is determined that the vehicle is running on a first lane and deleting an alarm area disposed outside a last lane when it is determined that the vehicle is running on the last lane.

11. The back-sideways alarming system of claim 1, wherein the electronic control unit removes an area, which should not generate the alarm, from the variably settable area according to the information on the recognized lane and the road information.

12. The back-sideways alarming system of claim 1, wherein the collecting unit comprises a radar.

13. The back-sideways alarming system of claim 1, wherein the collecting unit collects the target information including at least one of a distance, an angle, a course angle and a relative speed with respect to the one or more target vehicles or target objects located around the vehicle.

14. The alarming control method according to claim 6, wherein the changing the variably settable alarm area comprises removing an area, which should not generate the alarm, from the variable stable area according to the information on the recognized lane and the road information.

15. The alarming control method according to claim 6, wherein the information collecting unit comprises a radar.

16. The alarming control method according to claim 6, wherein the receiving the target information comprises collecting the target information including at least one of a distance, an angle, a course angle and a relative speed with respect to the one or more target vehicles or target objects located around the vehicle.

* * * * *